(12) United States Patent
Sherlock et al.

(10) Patent No.: US 9,243,217 B2
(45) Date of Patent: Jan. 26, 2016

(54) METHOD OF CLEANING SOLAR PANELS WITH A COMPOSITION COMPRISING AN ORGANIC PHOSPHORIC ACID OR AN ORGANIC PHOSPHONIC ACID OR SALTS THEREOF AS SEQUESTRANT

(71) Applicant: Saint-Gobain Ceramics & Plastics, Inc., Worcester, MA (US)

(72) Inventors: Jason Alexander Sherlock, Anaheim, CA (US); Douglas E. Ward, Santa Ana, CA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/501,120

(22) Filed: Sep. 30, 2014

(65) Prior Publication Data

US 2015/0094247 A1    Apr. 2, 2015

Related U.S. Application Data

(60) Provisional application No. 61/884,746, filed on Sep. 30, 2013.

(51) Int. Cl.
    *C11D 9/34*     (2006.01)
    *C11D 7/36*     (2006.01)
    *C11D 11/00*    (2006.01)

(52) U.S. Cl.
    CPC .............. *C11D 7/36* (2013.01); *C11D 11/0035* (2013.01); *C11D 11/0041* (2013.01)

(58) Field of Classification Search
    CPC .......... C11D 9/34; C11D 7/36; C11D 7/5009; C11D 7/5013; C11D 11/0023; C11D 11/0035
    See application file for complete search history.

(56) References Cited

U.S. PATENT DOCUMENTS

| | | | |
|---|---|---|---|
| 5,770,548 A * | 6/1998 | Leskowicz et al. | 510/181 |
| 8,025,808 B2 | 9/2011 | Laconto et al. | |
| 8,168,075 B2 | 5/2012 | Laconto et al. | |
| 8,303,717 B2 * | 11/2012 | Tamura et al. | 134/1 |
| 2005/0058719 A1 * | 3/2005 | Ramirez et al. | 424/616 |
| 2005/0119144 A1 | 6/2005 | Kennedy et al. | |
| 2006/0100122 A1 * | 5/2006 | Baars et al. | 510/375 |
| 2007/0227978 A1 | 10/2007 | Mitsumoto | |
| 2008/0064622 A1 | 3/2008 | Villa et al. | |
| 2008/0069986 A1 | 3/2008 | Clifton et al. | |
| 2008/0314409 A1 | 12/2008 | Theyssen et al. | |
| 2009/0312219 A1 * | 12/2009 | Tamura et al. | 510/245 |
| 2010/0261632 A1 | 10/2010 | Korzenski et al. | |
| 2012/0032571 A1 | 2/2012 | Schoen | |
| 2012/0090670 A1 | 4/2012 | Yoon et al. | |
| 2012/0260938 A1 | 10/2012 | Zack et al. | |
| 2012/0321568 A1 | 12/2012 | Gonzales et al. | |
| 2014/0116472 A1 | 5/2014 | Dahlquist et al. | |

FOREIGN PATENT DOCUMENTS

| | | |
|---|---|---|
| EP | 2431454 A1 | 9/2011 |
| EP | 2523900 A1 | 11/2012 |
| TW | 200744962 A | 12/2007 |
| WO | 0012661 | 3/2000 |
| WO | 0077142 A1 | 12/2000 |
| WO | 2012154498 A2 | 11/2012 |

OTHER PUBLICATIONS

International Search Report for Application No. PCT/US2014/058151, mailed Jan. 9, 2015, 1 page.

* cited by examiner

*Primary Examiner* — Charles Boyer
(74) *Attorney, Agent, or Firm* — Abel Law Group, LLP; Adam Keser

(57) ABSTRACT

A method for cleaning the glass surface of solar panels which employs the use of highly efficient sequestering agents and allows to replace deionized water with municipal or fresh water of up to a very high water hardness, without having a loss in the long term power output of the solar panels.

20 Claims, 2 Drawing Sheets

METHOD OF CLEANING SOLAR PANELS WITH A COMPOSITION COMPRISING AN ORGANIC PHOSPHORIC ACID OR AN ORGANIC PHOSPHONIC ACID OR SALTS THEREOF AS SEQUESTRANT

CROSS-REFERENCE TO RELATED APPLICATION(S)

This application claims priority under 35 U.S.C. §119(e) to U.S. Patent Application No. 61/884,746 entitled "Method of Cleaning Solar Panels," by Jason Alexander Sherlock and Douglas E. Ward, filed Sep. 30, 2013, which is assigned to the current assignee hereof and incorporated herein by reference in its entirety.

FIELD OF THE DISCLOSURE

The present disclosure, in general, relates to a method of cleaning the surface of a solar panel, and in particular, a method of cleaning the surface of a solar panel using a fluid comprising a sequestering agent.

BACKGROUND

A solar panel is a set of solar photovoltaic modules electrically connected and mounted on a supporting structure. It is a well known fact that without proper cleaning the surface of solar panels, the solar cells can lose up to 30% of their power production potential in a period of 3 to 24 months, depending on the local conditions.

Currently, deionized water is used, with or without a detergent, to clean solar panels, so that they can maintain their power output efficiency. Deionized water is used because hard water can leave behind mineral deposits, which can build up irreversibly on the solar panel surface.

A main cost factor in cleaning large areas of solar panels is the transportation and delivery of deionized water to the solar site. Sometimes, deionized water is produced at the solar site; however, in this case expenses still build up through the costs of filters, ion-exchange resin, and related equipment. Furthermore, the process of deionizing water can be very wasteful, since up to 50% of the water can be lost in the process and a waste stream of water with high concentrations of salts and minerals is produced.

There is a need for improved and more economical methods in cleaning solar panels.

SUMMARY

An embodiment provides a method for cleaning a surface of a solar panel, comprising diluting a concentrate with water to obtain a rinsing fluid, the water for diluting the concentrate having a water hardness greater than deionized water; and treating the surface of the solar panel with the rinsing fluid in a single-step rinsing operation and thereby cleaning the surface. The rinsing fluid comprises at least one sequestering agent adapted to sequester calcium, magnesium and/or other multi-valent cations contained in the water. Such sequestering agents can include at least one of an organic phosphonic acid or salt thereof, an organic phosphoric acid or salt thereof, or a combination thereof.

In another embodiment, a method for cleaning a surface of a solar panel, comprising diluting a concentrate with water to obtain a rinsing fluid, the water for diluting the concentrate having a water hardness greater than deionized water; and treating the surface of the solar panel with the rinsing fluid in a single-step rinsing operation and thereby cleaning the surface, wherein the concentrate comprises at least one sequestering agent adapted to sequester calcium, magnesium, and/or other multi-valent ions contained in the water used for diluting the concentrate, the sequestering agent including at least one of 1-hydroxy ethylidene-1,1-diphosphonic acid (HEDP); inositol hexakisphosphate (IHKP); or at least one salt thereof; or a combination thereof; and the concentrate is essentially free of surfactants.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
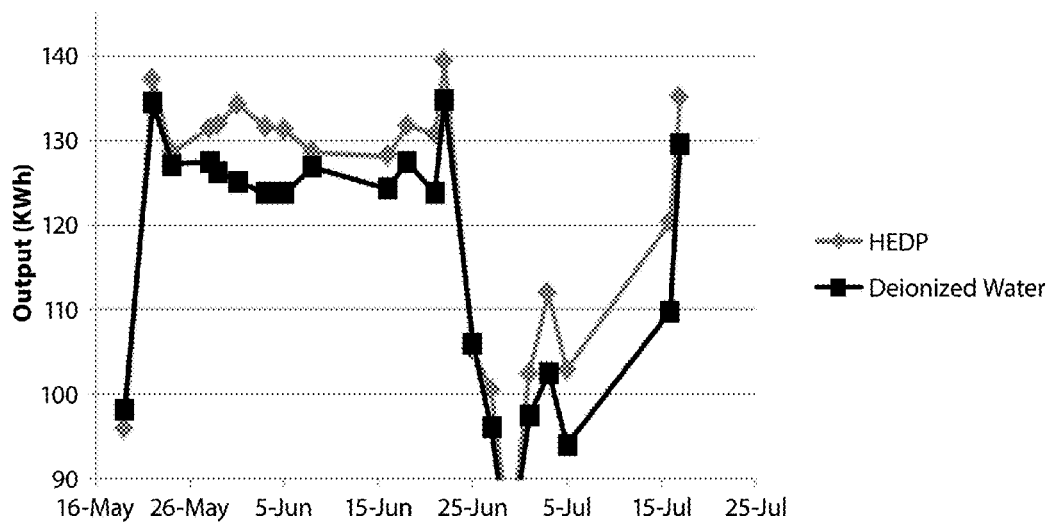
FIG. 1 includes test data comparing the long time power output of solar panels cleaned with a rinsing solution made from a concentrate representative of an embodiment compared to a conventional approach using deionized water.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The terminology used herein if for the purpose of describing particular embodiments only, and is not intended to be limiting.

As used herein, "water hardness" addresses the amount of multivalent cations in the water (with a charge greater than 1+). The water hardness corresponds to the calcium and magnesium ion content of the water ($Ca^{2+}$ and $Mg^{2+}$), however other multi-valent cations, for example, iron, aluminum, and manganese, can also be present in the water and elevate the water hardness. In the context of this application, 1 American degree water hardness corresponds to an equivalent of 1 ppm or 1 mg/l $CaCO_3$.

As used herein, the terms "soft water", "hard water" and "very hard water" are used according to the classification of the U.S. Geological Survey (USGS), which classifies water with a hardness of 0 to 60 mg/l as soft water; water with a hardness of 61 to 120 mg/l as moderately hard water, water with a hardness of 121 to 180 mg/l as hard water, and water with a hardness of greater than 180 mgl/l as very hard water.

As used herein, the term ground water refers to the water beneath the earth's surface in soil pore spaces or fractures of rock formations, and is often withdrawn for agricultural, municipal and industrial use. According to the type of soil of a location, ground water may be characterized as soft water, hard water, or very hard water, depending on the amount of hard water ions contained in the ground water, especially Ca and Mg ions.

As used herein, "fresh water" is naturally occurring water on the Earth's surface that has not been treated through a deionization process. It refers to water in ice sheets, rivers, lakes, underground streams, ground water and other bodies of water. It excludes Seawater and Brackish water and typically has a salinity content of <0.05%, but can contain high levels of Ca, Mg and other multi-valent ions.

As used herein, "deionized water" is water purified by distillation or treatment with ion exchange materials to eliminate the ions contained in the water (specifically calcium and magnesium ions). The water hardness of deionized water in the context of the present disclosure is not greater than 5 mg/l.

As used herein, a "solar panel" is at least one photovoltaic module, which may be fixed on a supporting structure. A photovoltaic module may be considered a packaged, connected assembly of solar cells. The solar panels may use any known combination of components suitable for converting sun energy into electrical energy.

Various embodiments of the present disclosure will now be described, by way of example only, with reference to the accompanying drawings.

The present disclosure relates to an efficient method of cleaning solar panels by allowing the use of water with varying hardness, such that local fresh water or municipal water may be used, and thereby eliminating the need of deionized water. In a particular embodiment, the cleaning process may utilize only fresh water and municipal up to a very high hardness and may not utilize deionized water.

The surface of the solar panel that can be subjected to the cleaning method of the present disclosure may typically be a transparent layer which covers and protects the solar cells. The surface of the solar panel as used herein is a radiation transmitting surface intended to be the primary incident surface of the solar panel for radiation to strike for operation of the solar cell. The material of the surface of the solar panels may be any appropriate transparent material suitable for protecting the solar cells and allowing light transmission. For example, the material of the surface of the solar panel may include glass, such as silicate glass, or a transparent polymer, such as an acrylic polymer, polycarbonate, or polyethylene terephthalate. The surface of the solar panel may also have a multi-layered structure, for example, silicate glass coated with a transparent polymeric film.

In one embodiment, the method may include diluting a concentrate to obtain a rinsing fluid and treating the surface of a solar panel with the rinsing fluid in a single-step rinsing operation. As used herein, a single-step rinsing operation means that the surface of the solar panel may be treated with the rinsing fluid only, such that any additional pre-treatment or post-treatment steps involving cleaning or rinsing with other types of cleaning or rinsing fluids may not be necessary.

In an embodiment, the concentrate of the present disclosure may include one or more particular sequestering agents suitable for sequestering the multivalent cations contained in the water used for diluting the concentrate.

In one embodiment, the concentrate may contain a sequestering agent including at least one organic phosphoric acid or salt thereof, or at least one organic phosphoric acid or salt thereof, or a combination of any of the foregoing. In a particular embodiment, the sequestering agent may include at least one of 1-Hydroxy Ethylidene-1,1-Diphosphonic Acid (HEDP); Amino tris(methylene phosphonic acid) (ATMP); 2-Aminoethylphosphonic acid (AEPn); Ethylenediamine tetra(methylene phosphonic acid (EDTMP); Tetramethylenediamine tetra(methylene phosphonic acid (TDTMP); Hexamethylenediamine tetra(methylene phosphonic acid (HDTMP); Diethylenetriamine penta(methylene phosphonic acid (DTPMP); Phosphonobutane-tricarboxylic acid (PBTC); N-(phosphonomethyl) iminodiacetic acid (PMIDA); 2-carboxyethyl phosphonic acid (CEPA); Aminotris-(methylene-phosphonic acid (AMP); Inositol Hexakisphosphate (IHKP); or at least one salt thereof; or any combination thereof.

In a preferred embodiment, the at least one sequestering agent can comprise 1-hydroxy ethylidene-1,1-diphosphonic acid (HEDP) or a salt thereof; inositol hexakisphosphate (IHKP) or a salt thereof; or a combination thereof.

In one aspect, the concentrate may include a sequestering agent comprising 1-Hydroxy Ethylidene-1,1-Diphosphonic Acid (HEDP), or a salt thereof, and in a particular aspect, the concentrate may include a sequestering agent consisting essentially of 1-Hydroxy Ethylidene-1,1-Diphosphonic Acid (HEDP) or a salt thereof.

In another aspect, the concentrate may include Inositol Hexakisphosphate (IHKP) or a salt thereof, and in a particular aspect, the sequestering agent of the concentrate may consist essentially of Inositol Hexakisphosphate (IHKP) or a salt thereof.

In a further embodiment, the at least one sequestering agent may be present in the concentrate in an amount of at least about 0.5 wt % based upon the total weight of the concentrate, such as at least about 1 wt %, at least about 2 wt %, at least about 3 wt %, at least about 4 wt %, at least about 5 wt %, or at least about 8 wt % based on the total weight of the concentrate. In another embodiment, the concentration can include at least one sequestering agent present in an amount of not greater than about 20 wt % for the total weight of the concentrate, such as not greater than about 15 wt %, not greater than about 13 wt %, or not greater than about 11 wt %, based on the total weight of the concentrate. It will be appreciated that the amount of the at least one sequestering agent present in the concentrate can be in a range from any of the minimum and maximum values noted above, such as from about 0.5 wt % to about 20 wt %, from about 1 wt % to about 15 wt %, or from about 5 wt % to about 10 wt %.

In one embodiment, the concentrate can be essentially free of surfactants. Under essentially free may be understood a surfactant concentration of not greater than 0.001 wt %, based on the total weight of the concentrate.

In yet another embodiment, the concentrate may consist essentially of at least one sequestering agent, water, and optionally a pH modifying agent.

The optional pH modifying agent may be an acid, a base, or a buffer, which may adjust a pH of the concentrate in the range from about 3 to about 13. Preferably, the pH modifying agent may be a base, such as, e.g., potassium hydroxide or sodium hydroxide.

In a particular embodiment, the pH value of the concentrate may be greater than about 7.0, such as greater than about 7.5, greater than about 8.0, greater than about 8.5, greater than about 9.0, greater than about 9.5 or greater than about 10.0. In yet another embodiment, the pH of the concentrate may be not greater than about 13, such as not greater than about 12.5, or not greater than about 12.0.

It will be appreciated that the pH value of the concentrate can be in a range from any of the minimum and maximum values noted above, such as from about 3 to about 13, from about 5 to about 12.5, from about 7 to about 12.0, from about 9 to about 12, or from about 3 to about 7.

In a further embodiment, the at least one sequestering agent may be present in the rinsing fluid after dilution of the concentrate in an amount of at least about 0.01 wt % based upon the total weight of the concentrate, such as at least about 0.05 wt %, at least about 0.1 wt %, at least about 0.5 wt %, at least about 1 wt %. In another embodiment, the rinsing fluid can include at least one sequestering agent present in an amount of not greater than about 10 wt % for the total weight of the concentrate, such as not greater than about 5 wt %, not greater than about 3 wt %, or not greater than about 2 wt %, based on the total weight of the concentrate. It will be appreciated that the amount of the at least one sequestering agent present in the rinsing fluid can be in a range from any of the minimum and maximum values noted above, such as from about 0.01 wt % to about 10 wt %, from about 0.05 wt % to about 5 wt %, or from about 0.1 wt % to about 3 wt %.

In another embodiment, the method of the present disclosure may further comprise determining the water hardness of the water used for diluting the concentrate, and adjusting a ratio of the concentrate to the water for dilution. In one aspect, the ratio of the concentrate to the water for diluting the concentrate may be adjusted to produce a rinsing fluid wherein at least 90%, such as at least 95%, at least 97%, at least 98%, at least 99%, at least 99.5%, or at least 99.9% of the calcium, magnesium, and/or other multi-valent cations are bound to the sequestering agent of the original concentrate.

In another aspect, the ratio of concentrate to water for diluting the concentrate may be adjusted such that all hard water ions are sequestered by the sequestering agent, so that there are no water insoluble salts and an excess of free sequestering agent, which is not bound by hard water ions, is present in the rinsing solution. As used herein, an excess of free sequestering agent can mean an amount of sequestering agent which is not bound by calcium, magnesium, and/or other multi-valent cations contained in the rinsing solution. In an aspect, the amount of excess of free sequestering agent may be at least about 0.001 wt %, such as at least about 0.002 wt %, at least about 0.005 wt % or at least about 0.01 wt % based on the total weight of the rinsing fluid. In another aspect, the amount of excess sequestering agent may be not greater than about 1 wt %.

In one embodiment, the method of the present disclosure has been developed that the water for diluting the concentrate may be water of any hardness, such that municipal or fresh water of any location may be used. This allows the elimination of deionized water, which is currently one of the main cost factors for cleaning solar panels, especially in remote locations. Accordingly, the water for diluting the concentrate may be soft water, hard water and very hard water. In an aspect, the water used for diluting the concentrate may have a water hardness of at least about 10 mg/l, such as at least about 20 mg/l, at least about 30 mg/l, at least about 50 mg/l, at least about 100 mg/l, at least about 200 mg/l, or at least about 400 mg/l. In yet another aspect, the water used for diluting the concentrate may have a water hardness of not greater than about 1500 mg/l, such as not greater than about 1300 mg/l, not greater than about 1000 mg/l, or not greater than about 800 mg/l. It will be appreciated that the water hardness can be in a range from any of the minimum and maximum values noted above, such as from about 10 mg/l to about 1500 mg/l, from about 50 mg/l to about 1000 mg/l, or from about 80 mg/l to about 700 mg/l.

In yet a further aspect, the water for diluting the concentrate may have a conductivity of at least about 15 μS/cm, such as at least about 30 μS/cm, at least about 50 μS/cm, at least about 100 μS/cm, at least about 200 μS/cm, at least about 300 μS/cm, at least about 400 μS/cm, or at least about 500 μS/cm. In another aspect, the water may have a conductivity of not greater than about 5000 μS/cm, such as not greater than about 4000 μS/cm, not greater than about 3000 μS/cm, or not greater than about 2000 μS/cm. It will be appreciated that the conductivity of the water for diluting the concentrate can be in range from any of the minimum and maximum values noted above, such as from about 15 μS/cm to about 5000 μS/cm, from about 70 μS/cm to about 3500 μS/cm, or from about 150 μS/cm to about 1500 μS/cm.

The water for diluting the concentrate may be mixed with the concentrate, for example, with a metered hose pipe, or in a large tank.

In an embodiment, a ratio of the concentrate to water for diluting the concentrate is not greater than about 1:20, such as not greater than about 1:30; not greater than about 1:50, not greater than about 1:100, not greater than about 1:300, not greater than about 1:500, not greater than about 1:750, not greater than about 1:1000, or not greater than about 1:1700. In another embodiment, a ratio of the concentrate to water for diluting the concentrate is at least about 1:10,000, such as at least about 1:7000, at least about 1:5000, at least about 1:3000, or at least about 1:1000. It will be appreciated that the ratio of the concentrate to water for diluting the concentrate can be in a range from any of the minimum and maximum values noted above, such as from about 1:20 to about 1:10,000, from about 1:40 to about 1:6000; or from about 1: 150 to about 1:1500.

In an embodiment, the concentrate of the method of the present disclosure may optionally employ further additives, such as preservatives, viscosity modifying agents or others for cosmetic purposes.

In developing the method of the present invention, the components of the concentrate can be suitable to maintain the performance of the solar panels using a single-step rinsing operation compared to other cleaning and or rinsing operations, particularly those using deionized water. For example, certain surfactants lead to the formation of certain water insoluble deposits not completely removed. Moreover, it is known that certain chelating agents, for example EDTA, may cause corrosion of glass during extended exposure.

In an embodiment, the one-step rinsing operation of the solar panels may include wetting the surface of the solar panels with the rinsing fluid, scrubbing or rubbing the panel surface with a brush, cloth, or other suitable objects and rinsing the treated surface with further rinsing fluid. In another embodiment, the one-step rinsing operation can be conducted only by pressure-spraying the rinsing fluid over the solar panel surface.

In an embodiment, after the treatment of the solar panels with the rinsing fluid, no further rinsing with deionized water may be required. In fact, in a particular embodiment, the single-step rinsing operation can be conducted without the use of deionized water, and completed using only municipal water or fresh water.

It has been surprisingly discovered that the methods of the present disclosure allow the use of water up to a very high hardness for cleaning solar panels to maintain the performance of the solar panels over a long period of time, which is comparable to conventional and more laborious processes using multiple cleaners, multiple steps, and/or requiring the use of deionized water.

The methods of the present disclosure make it possible to eliminate the use of deionized water, which can be considered as a big economic advantage in comparison to the industrial standard, where the cleaning of the solar panels relies on the use of deionized water, either for diluting a cleaner or for rinsing.

The following examples are illustrative of the present invention, and are not to be construed as limiting the scope of the invention. Variations and equivalents of these examples will be apparent to those of skill in the art in light of the present disclosure, the drawings, and the claims herein. Unless otherwise stated, all percentages are by weight of the total composition.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Items:

Item 1: A method for cleaning a surface of a solar panel, comprising: diluting a concentrate with water to obtain a rinsing fluid, the water for diluting the concentrate having a water hardness greater than deionized water; and treating the surface of the solar panel with the rinsing fluid in a single-step rinsing operation and thereby cleaning the surface, wherein the concentrate comprises at least one sequestering agent adapted to sequester calcium, magnesium and/or other multivalent cations contained of the water used for diluting the concentrate, the sequestering agent including at least one of an organic phosphonic acid or salt thereof, an organic phosphoric acid or salt thereof, or a combination thereof.

Item 2: The method of item 1, wherein the sequestering agent includes at least one of 1-hydroxy ethylidene-1,1-diphosphonic acid (HEDP); amino tris(methylene phosphonic acid) (ATMP); 2-aminoethylphosphonic acid (AEPn); ethylenediamine tetra(methylene phosphonic acid (EDTMP); tetramethylenediamine tetra(methylene phosphonic acid (TDTMP); hexamethylenediamine tetra(methylene phosphonic acid (HDTMP); diethylenetriamine penta(methylene phosphonic acid (DTPMP); phosphonobutane-tricarboxylic acid (PBTC); N-(phosphonomethyl) iminodiacetic acid (PMIDA); 2-carboxyethyl phosphonic acid (CEPA); amino-tris-(methylene-phosphonic acid (AMP); inositol hexakisphosphate (IHKP); or at least one salt thereof; or any combination thereof.

Item 3: The method of item 2, wherein the at least one sequestering agent comprises 1-hydroxy ethylidene-1,1-diphosphonic acid (HEDP) or a salt thereof; inositol hexakisphosphate (IHKP) or a salt thereof; or a combination thereof.

Item 4: The method of item 3, wherein the at least one sequestering agent consists essentially of 1-hydroxy ethylidene-1,1-diphosphonic acid (HEDP).

Item 5: The method of item 3, wherein the at least one sequestering agent consists essentially of inositol hexakisphosphate (IHKP).

Item 6: The method of any of items 1 to 5, further comprising determining the hardness of the water used for diluting the concentrate; and adjusting a ratio of the concentrate to the water for diluting the concentrate.

Item 7: The method of item 6, wherein the ratio of the concentrate to the water for diluting the concentrate produces a rinsing fluid having at least 90% of the calcium, magnesium and/or other multivalent cations contained in the water bound to the at least one sequestering agent.

Item 8: The method of item 6, wherein the ratio of the concentrate to the water for diluting the concentrate produces a rinsing fluid comprising an excess of free sequestering agent not bound to calcium, magnesium and/or other multi-valent cations contained in the water.

Item 9: The method of item 6, wherein the ratio of the concentrate to the water for diluting the concentrate produces a rinsing fluid containing no water insoluble salts.

Item 10: The method of any of items 1 to 9, wherein the water has a water hardness of at least 5 ppm, such as at least 10 ppm, at least 30 ppm, at least 50 ppm, at least 100 ppm, or at least 180 ppm expressed as $CaCO_3$ equivalent.

Item 11: The method of any of items 1 to 10, wherein the water has water hardness of not greater than 1500 ppm, such as not greater than 1200 ppm, not greater than 1000 ppm, or not greater than 800 ppm expressed as $CaCO_3$ equivalent.

Item 12: The method of any of items 1 to 10, wherein the water has a conductivity of at least 15 µS/cm, such as at least 30 µS/cm, at least 50 µS/cm, at least 100 µS/cm, at least 200 µS/cm, at least 300 µS/cm, at least 400 µS/cm, or at least 500 µS/cm.

Item 13: The method of any of items 1 to 12, wherein the water has a conductivity of not greater than 5000 µS/cm, such as not greater than 4000 µS/cm, not greater than 3000 µS/cm, or not greater than 2000 µS/cm.

Item 14: The method of any of items 1 to 13, wherein the water is municipal water or fresh water.

Item 15: The method of any of items 1 to 14, wherein the concentrate is essentially free of surfactants.

Item 16: The method of any of items 1 to 15, wherein the rinsing fluid consists essentially of the at least one sequestering agent, water, and optionally a pH modifying base.

Item 17: The method of any of items 1 to 16, wherein a pH of the concentrate is greater than 7, such as greater than 8, greater than 8.5, greater than 9.0, greater than 9.5, or greater than 10.0.

Item 18: The method of any of items 1 to 17, wherein the at least one sequestering agent of the concentrate is present in an amount of at least 1 wt %, such as at least 2 wt %, at least 3 wt %, at least 4 wt %, at least 5 wt %, or at least 8 wt % based on the total weight of the concentrate.

Item 19: The method of any of items 1 to 17, wherein the at least one sequestering agent of the concentrate is present in an amount of not greater than 25 wt %, such as not greater than 20 wt %, not greater than 15 wt %, or not greater than 13 wt % based on the total weight of the concentrate.

Item 20: The method of any of items 1 to 19, wherein a ratio of the concentrate to water for diluting the concentrate is in a range of not greater than 1:20 to at least 1:10,000.

Item 21: The method of any of items 1 to 20, wherein a material of the surface of the solar panel comprises glass or a transparent polymer.

Item 22: A method for cleaning a surface of a solar panel, comprising: diluting a concentrate with water to obtain a rinsing fluid, the water for diluting the concentrate having a water hardness greater than deionized water; and treating the surface of the solar panel with the rinsing fluid in a single-step rinsing operation and thereby cleaning the surface, wherein the concentrate comprises at least one sequestering agent adapted to sequester calcium, magnesium, and/or other multi-valent cations contained of the water used for diluting the concentrate, the sequestering agent including at least one of 1-hydroxy ethylidene-1,1-diphosphonic acid (HEDP); inositol hexakisphosphate (IHKP); or at least one salt thereof; or a combination thereof; and the concentrate is essentially free of surfactants.

Item 23: The method of item 22, wherein the water is municipal water or fresh water.

EXAMPLES

The following non-limiting examples illustrate the present invention.

Example 1

A concentrate was prepared including 11 wt % HEDP based on the total amount of the concentrate, deionized water, and potassium hydroxide. The concentrate had a pH of 10.5.

Example 2

A rinsing fluid was prepared by diluting the concentrate of Example 1 with municipal water having a hardness of 1200 mg/l. The dilution of the concentrate was conducted by metering the concentrate through a cleaning hose at a concentration of 1.5% by volume with respect to the volume of the local, municipal water. Accordingly, the rinsing fluid was formed to have 1.5 vol % of the concentrate for the total volume of the rinsing fluid.

The rinsing fluid was tested on two separate solar arrays at two different facilities located in Arizona.

Solar panels of an area per panel of approximately 0.75 m$^2$ (about 1 meter×0.75 meter) were initially wetted on their light incident surface configured to transmit sun radiation to the solar cells with ¼ gallons per panel of the prepared rinsing fluid, and thereafter scrubbed with a hog's hair brush and finally rinsed with ½ gallon of the rinsing fluid per panel. After the rinsing of the solar panels, the power output of the solar panels over a time period of 2 months was observed, see FIGS. 1 and 2.

The output performance for each facility was tracked over a time period of two months and compared to a second array at each facility that was cleaned with deionized water. The power output results are shown in FIGS. 1 and 2.

Figure 2:
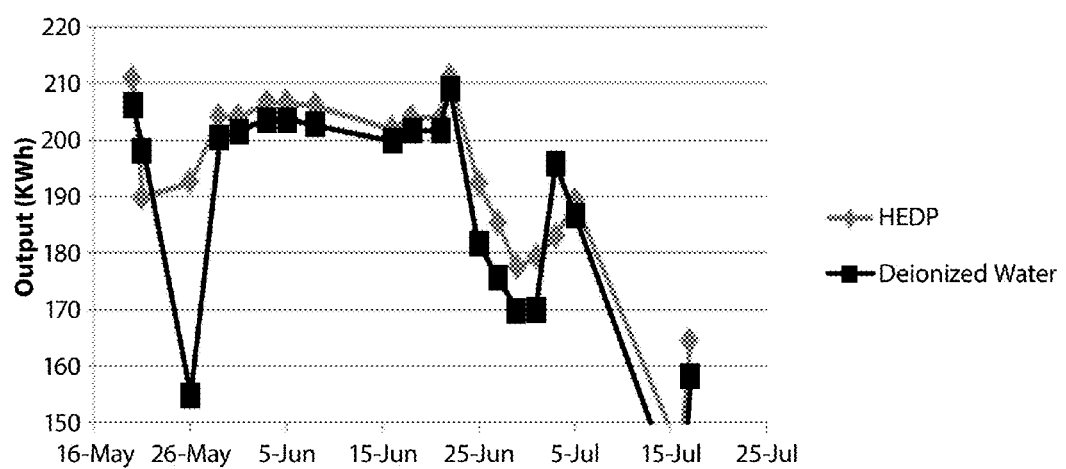
FIG. 2 includes test data comparing the long time power output of solar panels cleaned with a rinsing solution made from a concentrate representative of an embodiment compared to a conventional approach using deionized water.

The comparisons of FIGS. 1 and 2 show that by conducting the method of the present invention, it is possible to employ fresh water or municipal water up to a very high hardness for cleaning solar panels without having any detrimental effect on the long term power output of the panels. Moreover, and quite unexpectedly, the use of the single-step rinsing operation proved to have an improvement in the power output of the solar panels compared to the conventional rinsing operation using deionized water.

Example 3

A comparison was made to investigate the ability of the sequestering agents HEDP, IHKP and EDTA to prevent dust adhesion on the surface of solar panels after subjected to a single-step rinsing operation.

Glass samples (3.5 inch×4 inch) were treated on one side with 10 ml of an aqueous solution comprising the respective sequestering agent at a concentration of 0.1 to 0.7 wt % based on the total weight of the solution, such that the entire surface of the glass was covered with the solution. The glass samples were placed in a horizontal position and allowed to dry at room temperature for 6 hours. On the dried glass samples, collected desert dirt (29 Palms, Calif.) was poured over the glass sample until the entire surface was immersed in dirt. After 10 seconds, the dirt was shaken off and the glass samples vertically positioned so that excess dirt may fall off. Thereafter, the glass samples were inspected for dust adhesion.

The results of the dust adhesion experiment showed for IHKP and HEDP treated glass an adhesion of only a few dust spots or clumps to the glass surface. In contrast to the adhesion results with IHKP and HEDP treatment, the EDTA treated glass surface contained large patches of strongly adhered dust particles maintained on the glass surface.

The dust adhesion tests demonstrate that especially HEDP and IHKP can provide some protection against dust adhesion on a glass surface, while quite unexpectedly, EDTA shows inferior results compared to HEDP and IHKP.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for cleaning a surface of a solar panel, comprising:
    diluting a concentrate with water to obtain a rinsing fluid, the water for diluting the concentrate having a water hardness greater than deionized water; and
    treating the surface of the solar panel with the rinsing fluid in a single-step rinsing operation and thereby cleaning the surface,
    wherein the concentrate comprises at least one sequestering agent adapted to sequester calcium, magnesium and/or other multi-valent cations contained of the water used for diluting the concentrate, the sequestering agent including at least one of an organic phosphonic acid or salt thereof, an organic phosphoric acid or salt thereof, or a combination thereof, and wherein the concentrate is essentially free of surfactants.

2. The method of claim 1, wherein the sequestering agent includes at least one of 1-hydroxy ethylidene-1,1-diphosphonic acid (HEDP); amino tris(methylene phosphonic acid) (ATMP); 2-aminoethylphosphonic acid (AEPn); ethylenediamine tetra(methylene phosphonic acid (EDTMP); tetramethylenediamine tetra(methylene phosphonic acid (TDTMP); hexamethylenediamine tetra(methylene phosphonic acid (HDTMP); diethylenetriamine penta(methylene phosphonic acid (DTPMP); phosphonobutane-tricarboxylic acid (PBTC); N-(phosphonomethyl) iminodiacetic acid (PMIDA); 2-carboxyethyl phosphonic acid (CEPA); amino-tris-(methylene-phosphonic acid (AMP); inositol hexakisphosphate (IHKP); or at least one salt thereof; or any combination thereof.

3. The method of claim 2, wherein the at least one sequestering agent comprises 1-hydroxy ethylidene-1,1-diphosphonic acid (HEDP) or a salt thereof; inositol hexakisphosphate (IHKP) or a salt thereof; or a combination thereof.

4. The method of claim 3, wherein the at least one sequestering agent consists essentially of 1-hydroxy ethylidene-1, 1-diphosphonic acid (HEDP) or a salt thereof.

5. The method of claim 3, wherein the at least one sequestering agent consists essentially of inositol hexakisphosphate (IHKP) or a salt thereof.

6. The method of claim 1, further comprising determining the hardness of the water used for diluting the concentrate; and adjusting a ratio of the concentrate to the water for diluting the concentrate.

7. The method of claim 6, wherein the ratio of the concentrate to the water for diluting the concentrate produces a rinsing fluid having at least 90% of the calcium, magnesium and/or other multivalent cations contained in the water bound to the at least one sequestering agent.

8. The method of claim 6, wherein the ratio of the concentrate to the water for diluting the concentrate produces a rinsing fluid comprising an excess of free sequestering agent not bound to calcium, magnesium and/or other multi-valent cations contained in the water.

9. The method of claim 6, wherein the ratio of the concentrate to the water for diluting the concentrate produces a rinsing fluid containing no water insoluble salts.

10. The method of claim 1, wherein the water has a water hardness of at least 5 ppm.

11. The method of claim 1, wherein the water has a conductivity of at least 15 μS/cm.

12. The method of claim 1, wherein the water is municipal water or fresh water.

13. The method of claim 1, wherein the rinsing fluid consists essentially of the at least one sequestering agent, water, and optionally a pH modifying base.

14. The method of claim 1, wherein a pH of the concentrate is greater than 7, such as greater than 8, greater than 8.5, greater than 9.0, greater than 9.5, or greater than 10.0.

15. The method of claim 1, wherein the at least one sequestering agent of the concentrate is present in an amount of at least 5 wt % based on the total weight of the concentrate.

16. The method of claim 1, wherein a ratio of the concentrate to water for diluting the concentrate is in a range of not greater than 1:20 to at least 1:10,000.

17. The method of claim 1, wherein a material of the surface of the solar panel comprises glass or a transparent polymer.

18. A method for cleaning a surface of a solar panel, comprising:
 diluting a concentrate with water to obtain a rinsing fluid, the water for diluting the concentrate having a water hardness greater than deionized water; and
 treating the surface of the solar panel with the rinsing fluid in a single-step rinsing operation and thereby cleaning the surface,
 wherein the concentrate comprises at least one sequestering agent adapted to sequester calcium, magnesium, and/or other multi-valent cations contained of the water used for diluting the concentrate, the sequestering agent including at least one of 1-hydroxy ethylidene-1,1-diphosphonic acid (HEDP); inositol hexakisphosphate (IHKP); or at least one salt thereof; or a combination thereof; and the concentrate is essentially free of surfactants.

19. The method of claim 18, wherein the water is municipal water or fresh water.

20. The method of claim 1, wherein the water has a hardness of at least 400 mg/l and not greater than 1500 mg/l.

* * * * *